US007574605B2

(12) United States Patent  (10) Patent No.: US 7,574,605 B2
Tanimoto et al.  (45) Date of Patent: Aug. 11, 2009

(54) METHOD OF MANAGING DIGITAL SIGNATURE, APPARATUS FOR PROCESSING DIGITAL SIGNATURE, AND A COMPUTER READABLE MEDIUM FOR RECORDING PROGRAM OF MANAGING DIGITAL SIGNATURE

(75) Inventors: Kouichi Tanimoto, Yokohama (JP); Shinji Itoh, Yokohama (JP); Kunihiko Miyazaki, Yokohama (JP); Narihiro Omoto, Toda (JP); Katsuko Nishioka, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 635 days.

(21) Appl. No.: 10/147,359

(22) Filed: May 17, 2002

(65) Prior Publication Data

US 2003/0182552 A1  Sep. 25, 2003

(30) Foreign Application Priority Data

Mar. 22, 2002  (JP)  ............................. 2002-080392

(51) Int. Cl.
 *H04L 9/00*  (2006.01)
(52) U.S. Cl. ..................... 713/177; 713/170; 713/180; 713/181; 713/176; 713/168
(58) Field of Classification Search .................. 713/168, 713/170, 176, 177, 180, 181
See application file for complete search history.

(56) References Cited

U.S. PATENT DOCUMENTS

| | | | |
|---|---|---|---|
| 5,136,646 A | | 8/1992 | Haber et al. |
| 5,956,404 A | * | 9/1999 | Schneier et al. ............. 713/180 |
| 6,192,131 B1 | * | 2/2001 | Geer et al. ................... 380/283 |
| 6,367,013 B1 | * | 4/2002 | Bisbee et al. ............... 713/178 |
| 6,868,406 B1 | * | 3/2005 | Ogg et al. ..................... 705/60 |

(Continued)

FOREIGN PATENT DOCUMENTS

EP  1 094 424  4/2001

(Continued)

OTHER PUBLICATIONS

Schneier, Bruce. Applied Cryptography, Second Edition: Protocols, Algorithms, and Source Code in C. John Wiley & Sons, Inc., 1996. pp. 84-85.*

(Continued)

*Primary Examiner*—Emmanuel L Moise
*Assistant Examiner*—Zachary A Davis
(74) *Attorney, Agent, or Firm*—McDermott Will & Emery LLP

(57) ABSTRACT

A method of managing digital signature includes the steps of preparing a signature log file storing signature log entry information, generating a new digital signature for a transmission message by reflecting, in the new digital signature, signature log entry information registered to the signature log file in the past; generating signature log entry information associated with the new digital signature and registering the signature log entry information to the signature log file; and preparing a user search file in addition to the signature log file; registering, to the user search file, user identifier information indicating a transmission destination of the transmitted digital signature and a transmission source of the received digital signature, with a correspondence established between the information, the user identifier information, and each signature log entry information in the signature log file.

10 Claims, 11 Drawing Sheets

U.S. PATENT DOCUMENTS

| | | | |
|---|---|---|---|
| 7,162,635 B2 * | 1/2007 | Bisbee et al. | 713/176 |
| 7,206,939 B2 * | 4/2007 | Miyazaki et al. | 713/193 |
| 7,337,315 B2 * | 2/2008 | Micali | 713/157 |
| 7,401,225 B2 * | 7/2008 | Tanimoto et al. | 713/178 |
| 7,441,115 B2 * | 10/2008 | Miyazaki et al. | 713/156 |
| 2002/0023221 A1 * | 2/2002 | Miyazaki et al. | 713/178 |
| 2002/0116207 A1 * | 8/2002 | Kido et al. | 705/1 |

FOREIGN PATENT DOCUMENTS

| | | |
|---|---|---|
| EP | 1 094 424 A2 | 4/2001 |
| JP | 2001-222219 | 8/2001 |
| JP | 2001-331104 | 11/2001 |
| JP | 2001-331105 | 11/2001 |

OTHER PUBLICATIONS

U.S. Appl. No. 09/693,713, filed Oct. 19, 2000, Miyazaki et al.
U.S. Appl. No. 09/697,666, filed Oct. 25, 2000, Susaki et al.
Rolf Oppliger, "Privacy Protection and Anonymity Services for the World Wide Web (WWW)" vol. 16, No. 4, pp. 379-391 XP004185850.

* cited by examiner

FIG.3A

SIGNATURE LOG FILE (2013)

| No. (3004) | PREVIOUS SIGNATURE LOG ENTRY HASH VALUE (3005) | MESSAGE HASH VALUE (3006) | USER'S SIGNATURE OR OTHER USER'S SIGNATURE LOG ENTRY INFORMATION (3007) |
|---|---|---|---|
| 1 (3001) | $H(S_0)$ | $H(M_1)$ | $Sign(1\|\|H(S_0)\|\|H(M_1))$ |
| 2 (3002) | $H(S_1)$ | — | $32\|\|H(S_{32})$ |
| 3 (3003) | $H(S_2)$ | $H(M_3)$ | $Sign(3\|\|H(S_2)\|\|H(M_3))$ |

FIG.3B

USER SEARCH FILE (2014)

| No. (3011) | TRANSMISSION / RECEPTION CODE (3012) | OTHER USER'S INFORMATION (3013) |
|---|---|---|
| 1 (3008) | TRANSMISSION | kunihiko@AAA.co.jp |
| 2 (3009) | RECEPTION | s-itoh@BBB.co.jp |
| 3 (3010) | TRANSMISSION | tanimoto@CCC.co.jp |

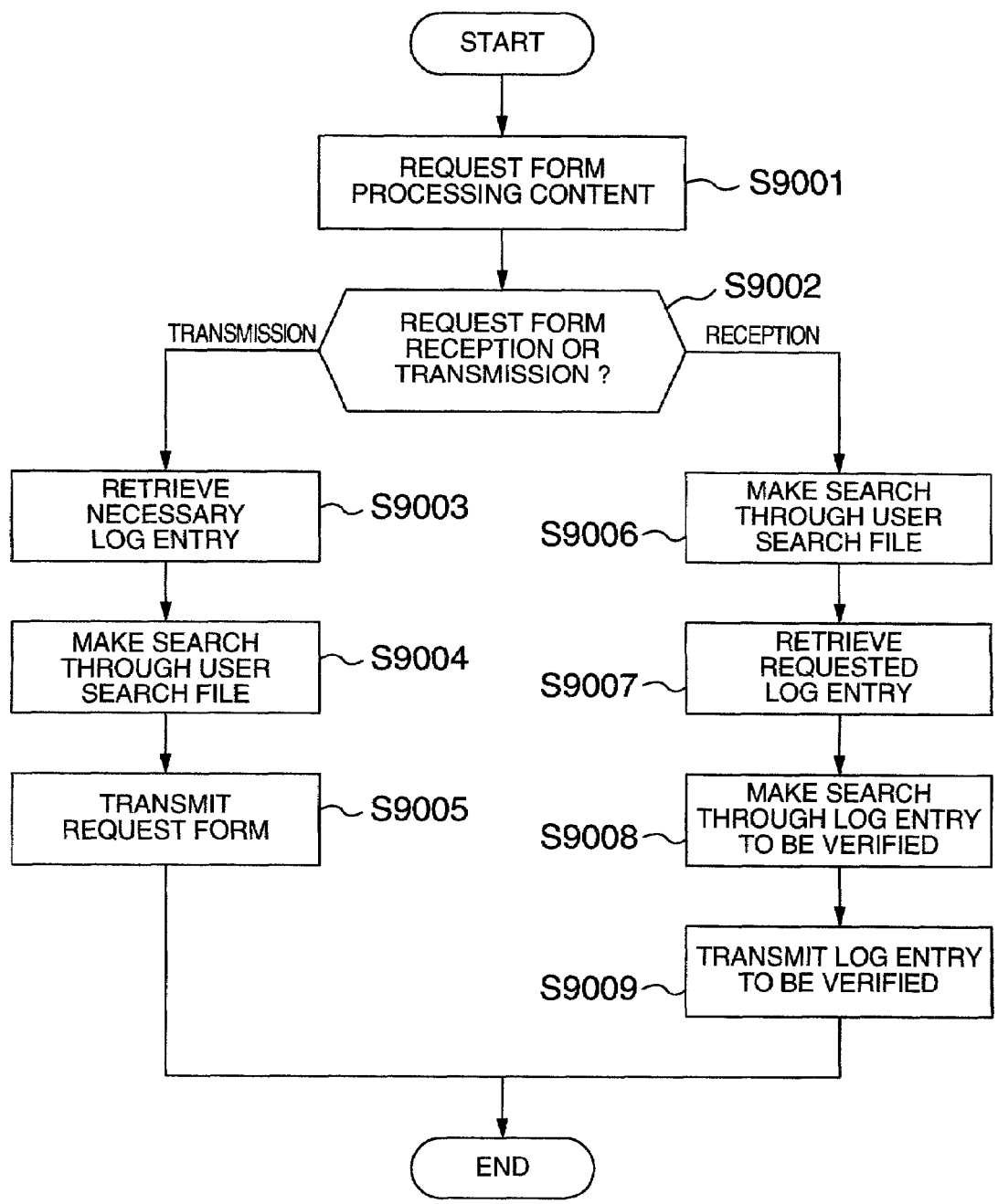

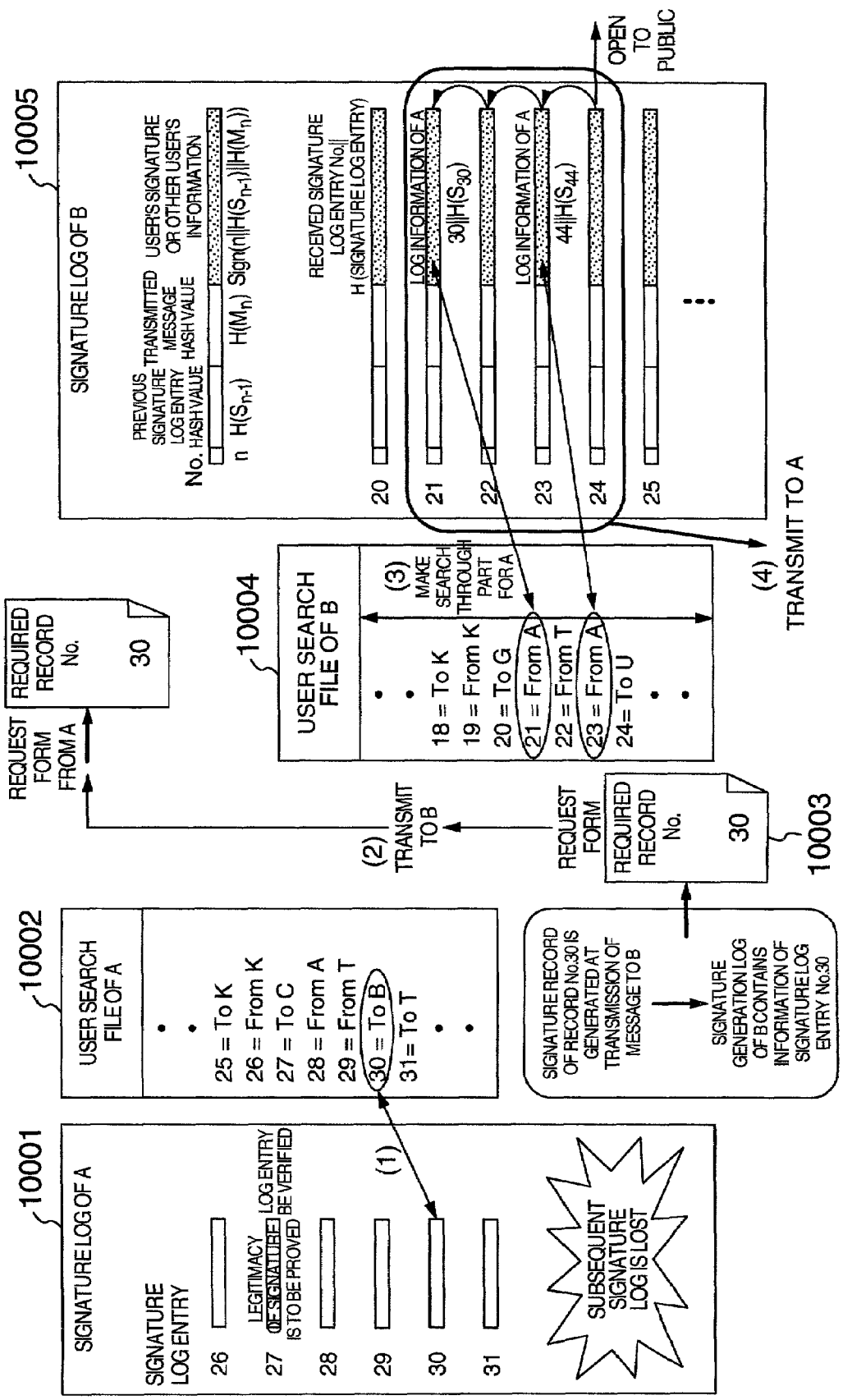

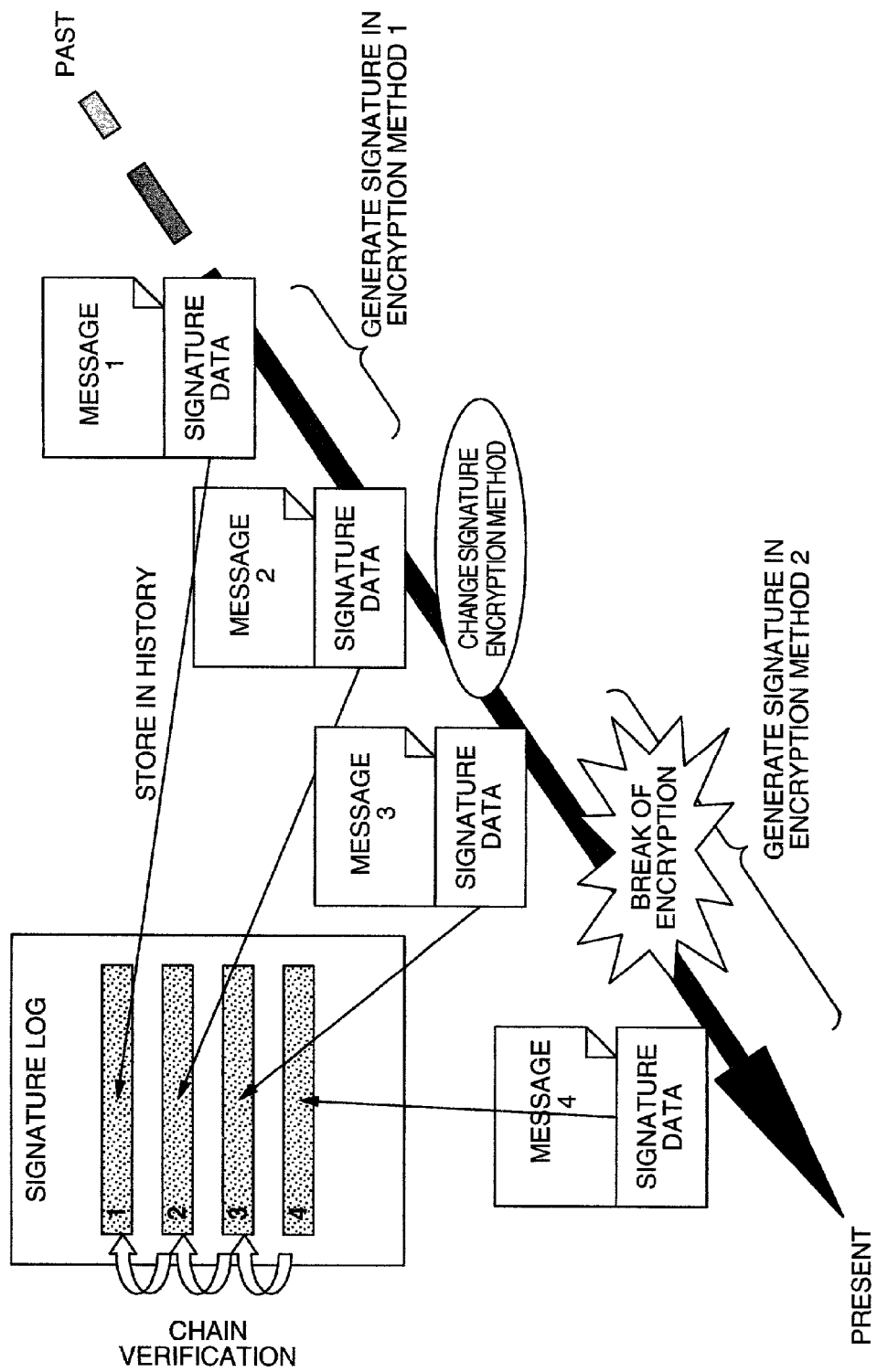

METHOD OF MANAGING DIGITAL SIGNATURE, APPARATUS FOR PROCESSING DIGITAL SIGNATURE, AND A COMPUTER READABLE MEDIUM FOR RECORDING PROGRAM OF MANAGING DIGITAL SIGNATURE

CROSS-REFERENCE TO RELATED APPLICATIONS

The present application relates to subject matters described in co-pending application Ser. No. 09/693,713 filed on Oct. 19, 2000 and Ser. No. 09/697,666 filed on Oct. 25, 2000 assigned to the assignee of the present application. The disclosures of the applications are incorporated herein by reference.

BACKGROUND OF THE INVENTION

The present invention relates to a digital signature technique, and in particular, to a digital signature technique suitably increasing credibility of a digital signature to authenticate a message or a document.

In electronic commerce, online shopping, and the like, a digital or electronic signature technique is used to prove that data (of a message or a document) received is data transmitted from a particular sender to thereby prevent so-called "personation" in which a person pretends to be another person.

In the digital signature, the contents of the message are guaranteed using, for example, a hash value thereof to prevent falsification of the message.

For example, JP-A-2001-331104, JP-A-2001-331105, and EP1094424A2 describe techniques of the prior art to improve credibility of the digital signature.

These articles describe techniques in which when a new signature is written or generated, information of signature log up to the point of time is reflected in the new signature. In other words, according to the techniques, signature information of the generated new signature is added to the signature log each time signature is generated. As a result, all items of the signature thus generated are related to each other in a chained configuration. In authentication of signature, the signature and the chain thereof are proved, and hence falsification of the signature becomes more difficult.

To further increase credibility, JP-A-2001-331104 and the corresponding European Patent Application EP1094424A2 describe a "log chain crossing" technique. In the technique, when a signature is received from the other party, information of signature log is generated for the received signature to thereby incorporate the signature information of the communicating other party in the receiver's signature log.

When the processing is executed in both communicating parties, the signature log up to when the latest signature was generated is stored mutually in the parties. Therefore, even when one of the parties loses his or her signature log, it is possible to restore the log by using the signature log entry stored in the other party.

However, above-mentioned articles describe neither specific information to be stored in the signature log nor an actual concrete method to implement the log chain crossing. Since the signature log is required to prove the signature chain, the signature log of a party is open to the other parties in some cases, and hence privacy of the party cannot be kept.

SUMMARY OF THE INVENTION

It is therefore an object of the present invention to solve the problems of the techniques of the prior art and to efficiently implement a digital signature having high credibility by using signature log and log chain crossing while protecting privacy of each user.

To achieve the object according to the present invention, a signature log file and a user search file are arranged to implement an efficient log chain crossing. At signature log update, a communication party of a message with signature is saved in the user search file together with information of an identifier (a signature number) of each digital signature log entry information to establish a correspondence to information of the signature log file. Resultantly, when the log chain crossing is used, the user can determine by using the user search file a correspondence between the information item and a particular user. That is, the information item is associated with a signature sent to or received from the other users.

Each digital signature log entry information registered to the signature log file includes identifier information (a signature number) to identify the associated information, a generated digital signature, and a hash value of the digital signature log entry information previously generated. Each time a digital signature is written or generated, digital signature log entry information is created corresponding to the digital signature to be additionally stored in the signature log file. The hash value of the digital signature log entry information previously generated is used to verify the signature log chain.

To implement an efficient log chain crossing, the signature log file is updated also at reception of a message with a digital signature. That is, using data or a message received together with the digital signature, digital signature log entry information of the communication party is created. The created information, a signature number, a hash value of the digital signature log entry information of the party, a hash value of the digital signature log entry information previously generated are then added as digital signature log entry information to the signature log file. At transmission of a document with a digital signature, digital signature log entry information corresponding to the digital signature is also saved in the signature log file of the other party.

Other objects, features and advantages of the invention will become apparent from the following description of the embodiments of the invention taken in conjunction with the accompanying drawings.

BRIEF DESCRIPTION OF THE DRAWINGS

FIGS. 3A and 3B are configuration examples of a signature log file and a user search file stored in the user apparatus of FIG. 2;

FIG. 9 is a flowchart showing an example of operation of a request form processing program in the user apparatus of FIG. 2;

FIG. 10 is a diagram to explain a concrete example of operation of a digital signature system according to the present invention; and FIG. 11 is a diagram to explain necessity of chain verification using a signature log entry.

DESCRIPTION OF THE EMBODIMENTS

Figure 1:
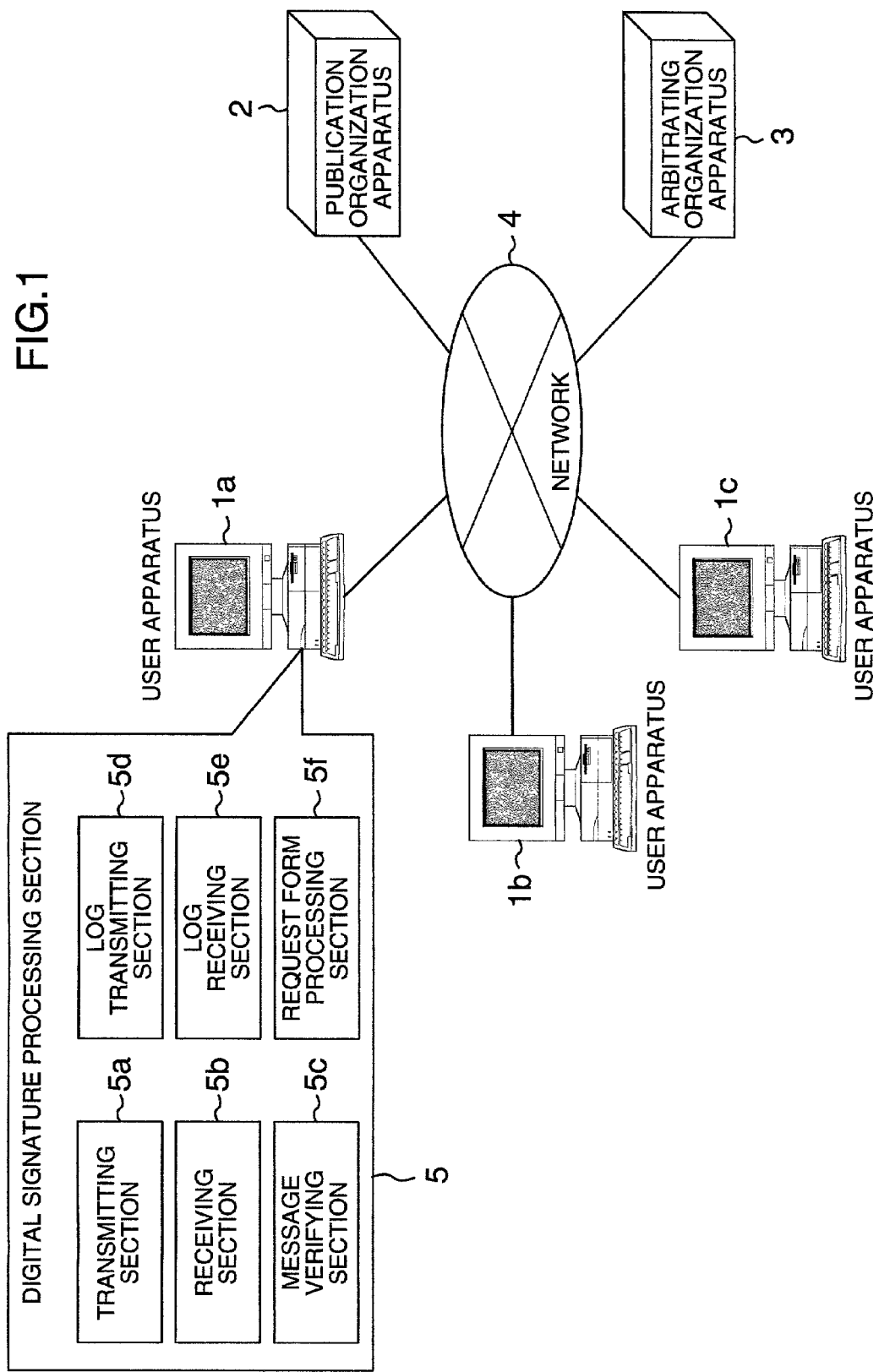
FIG. 1 is a block diagram showing a configuration example of a digital signature system according to the present invention.

Description will now be given in detail of an embodiment of the present invention by referring to the drawings.

Figure 2:
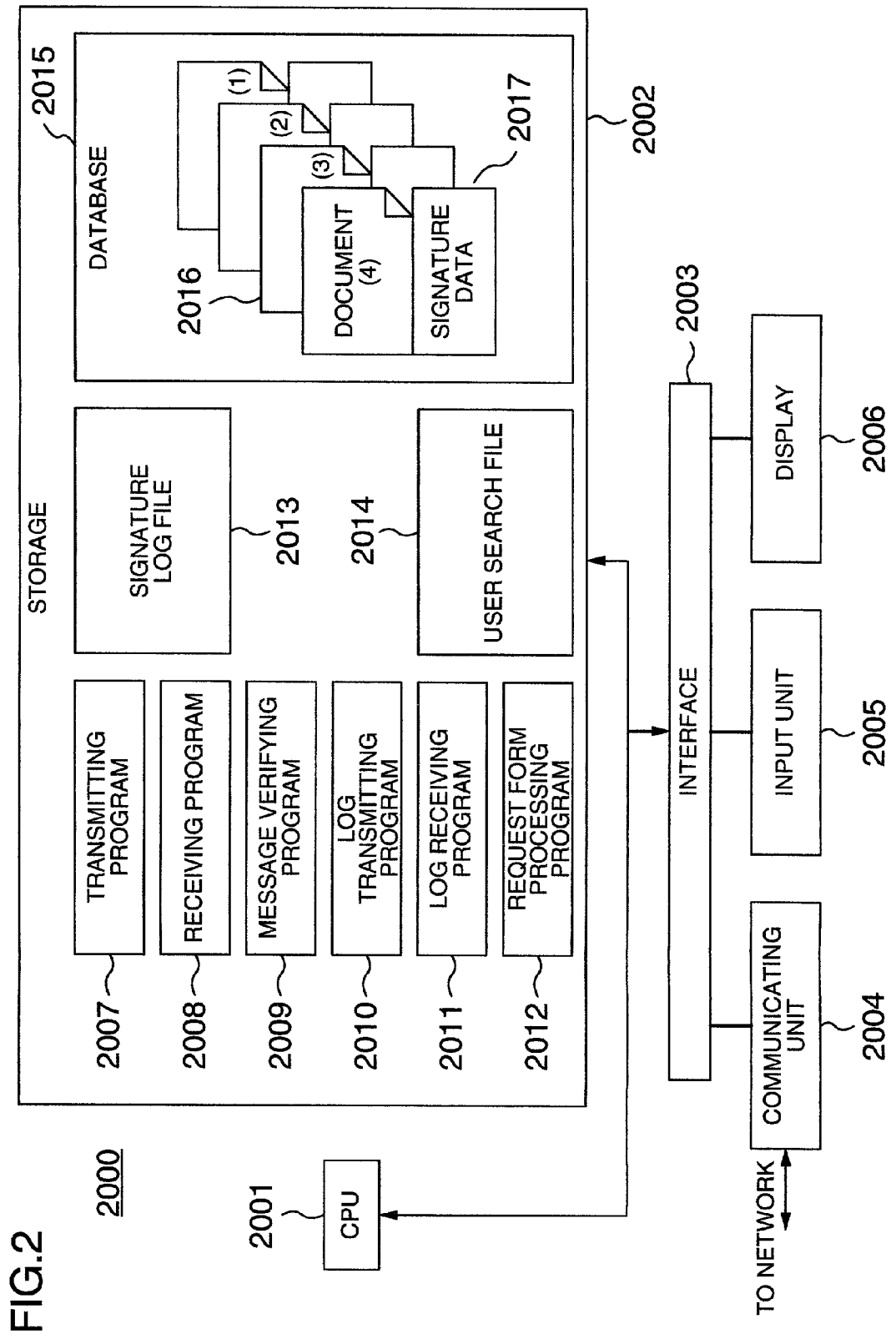
FIG. 2 is a block diagram showing a configuration example of a user apparatus of FIG. 1.

FIG. 1 shows in a block diagram an example of a configuration of a digital signature system according to the present invention. FIG. 2 shows a configuration example of the user apparatus of FIG. 1. FIG. 3 shows layout examples of a signature information file and a user search file stored in the user apparatus of FIG. 2.

The configuration of the digital signature system of FIG. 1 includes a plurality of user devices 1a to 1c, a publication organization 2, an arbitrating device 3, and a network 4 connecting the devices to each other. The publication organization device 2 opens a user signature log entry to the public. At occurrence of a conflict between users, the arbitrating organization device 3 objectively judges the conflict to solve the conflict.

Each of the devices 1a to 1c, 2, and 3 includes a computer system including a central processing unit (CPU), a main memory, a display, an input device, and an external storage. In the device, a program recorded by an optical disk driver or the like on a recording medium such as a compact disk (CD) read-only memory (ROM) or the like is installed in the external storage. The program is read therefrom to be loaded in the main memory and is then processed by the CPU to thereby achieve each processing function.

Description will now be given of an embodiment of a digital signature managing system according to the present invention. Processing of the user device 1a will be described as a representative example. A digital signature processing section 5 includes processing sections, i.e., a transmitting section 5a, a receiving section 5b, a message verifying section 5c, a log transmitting section 5d, a log receiving section 5d, and a request form processing section 5f. The sections 5a to 5f conduct functions respectively according to programs 2007 to 2012 of FIG. 2 executed by the CPU.

Each of the user devices 1a to 1c is operated, by the digital signature processing section 5, as a digital signature processing apparatus according to the present invention to communicate a message with a digital signature. The publication organization device 2 examines digital signature log entry information (to be simply referred to as a signature log entry hereinbelow) periodically transmitted from the user devices 1a to 1c and opens the signature log entry to the public. The arbitrating organization device 3 checks and judges validity of data such as a message or a document which cannot be solved between users of the user devices 1a to 1c.

Each of the user devices 1a to 1c as a digital signature processing apparatus is configured as shown in FIG. 2 and generates, in the example of the digital signature system, a digital signature (to be simply referred to as a signature hereinbelow), communicates a message with a signature and signature log, and verifies a message with a signature.

As shown in FIG. 2, each of the user devices 1a to 1c includes a storage 2002 having stored various programs 2007 to 2012 to respectively implement the functions (of the transmitting section 5a, the receiving section 5b, the message verifying section 5c, the log transmitting section 5d, the log receiving section 5d, and the request form processing section 5f) of the digital signature processing section 5 shown in FIG. 1, signature log 2013, and a user search file 2014; a communicating device 2004 to conduct communication via a network 4 with other devices, an input device 2005 such as a keyboard and a mouse, a display device 2006, and a CPU 2001.

The CPU 2001 reads the transmitting program 2007, the receiving program 2008, the message verifying program 2009, the log transmitting program 2010, the log receiving program, and the request form processing program 2012 via an interface 2003 from the storage 2002 to conduct various operations such as generation and verification of a signature and reading and updating the signature log file and the user search file according to the programs.

The storage 2002 stores a database 2015 in which a message 2016 generated in the past or received from another user in the past is saved together with digital signature data 2017 guaranteeing validity of the message and information such as a message number to identify the message. Any new message generated or received by the system is also saved in the database 2015 together with digital signature data thereof.

In the example, the message verification includes "verification using only a signature", "verification using own signature log (signature log of a user who generates a message with a signature), and "verification using another party's signature log (log chain crossing)".

For example, when a cryptographic system employed for the signature is not broken, it is only necessary to use "verification using only a signature". However, when a cryptographic system employed for the signature is broken, when leakage of a secret key used for the signature occurs or when there exists a fear of such leakage of a secret key, or when it is desired to highly ensure verification, "verification using own signature log" is also employed. When "verification using own signature log" is insufficient, "verification using another party's signature log" is employed.

Each of the user devices 1a to 1c sends a latest signature log entry to the publication organization device 2 in a periodic manner or in an interval of a fixed number of operations for the following reason. The publication organization associated with the publication organization device 2 opens the signature log entry to the public. This indicates that the record is legitimate.

The public device 2 examines a device or person who has generated the signature generation record received from the user device and opens the device or person to the public. If the device or person is not correct, the true actual device or true person who made the signature will give notice of an illegitimate signature log entry. Therefore, the signature log entry opened to the public can be treated as a legitimate signature log entry.

To indicate legitimacy of the signature log entry, the record can also be opened by a newspaper or the like in place of the publication organization.

When a request for judgement of legitimacy of a message is received from any one of the user devices 1a to 1c, the arbitrating device 3 receives therefrom the signature log file 2013 and the user search file 2014 associated with the message and examines weather or not the message is valid.

For example, when signature log necessary for the verification is missing in the user device 1a, signature log of another user device, namely, user device 1b or 1c must be used through the log chain crossing. However, there may exist a case in which a request of a person for a cooperative operation cannot be accepted. In such a case, an arbitrating organization of the arbitrating organization device 3 issues, in place of the person, a request for the cooperative operation. The arbitrating organization device 3 then receives the signature log from another user device to conduct the verification. For the user device 1b or 1c, the arbitrating organization device 3 authorizes, if a request for recognition of a result of the verification is received therefrom, the result of verification of the message.

As can be seen from the configuration of FIG. 2, each of the user devices 1a to 1c executes the processing of the digital signature system by the transmitting program 2007, the receiving program 2008, the message verifying program 2009, the log transmitting program 2010, the log receiving program, and the request form processing program 2012.

Moreover, each user device 1a, 1b, or 1c includes a signature log file 2013 to save a signature log entry and a user search file 2014 to store information of the communication other party. The files 2013 and 2014 are configures as shown in FIGS. 3A and 3B, respectively. In the description, it is assumed that the user device 1a includes the files 2013 and 2014 shown in FIGS. 3A and 3B.

As shown in FIG. 3A, the signature log file 2013 of the example includes records 3001 to 3003 of which each includes such items as a number 3004, a previous signature log entry hash value 3005, a message or document hash value 3006, and signature or other party signature log entry information 3007. As shown in FIG. 3B, the user search file 2014 of the embodiment includes records 3008 to 3010 each including such items as a number 3011, a communication identifier code 3012, and transmission destination party information 3013.

The number 3004 of the signature log file 2013 is sequentially assigned in a time series and is employed to specify a particular record (signature log entry) in the signature log.

The previous signature log entry hash value 3005 is employed to verify the sequence of log. For example, "H(S1)" in the previous signature log entry hash value 3005 of the record 3002 specified by the number "2" is calculated using values of the items 3004 to 3007, i.e., "1", "H(S0)", "H(M1)", and "Sign(1||H(S0)||H(M1))" of the record 3001 specified by the number "1".

The message hash value 3006 is employed to prove that the pertinent record, i.e., the sign generation record is appropriately related to an associated signature. However, the message hash value 3006 need not be necessarily kept remained as an item in the signature log file 2013.

At generation of a signature in the user device 1a, the signature or other party signature log entry information 3007 stores signature log entry information generated for the items 3004 to 3006. At reception of a signature from the other user device 1b or 1c, the signature or other party signature log entry information 3007 stores signature log entry information similarly generated in the other user device.

For example, the record 3001 is generated by the user device 1a, and the item 3007 includes a signature "Sign(1||H(S0)||H(M1))" generated using the values "1", "H(S0)", "H(M1)" of the respective items 3004 to 3006.

The record 3002 generated by the other user device is received therefrom, the item 3007 stores a value "32||H(S32)" generated by and transmitted from the other user device. In the value, "32" is a record number (the value of the number 3004) of the signature log file 2013 in the other user device.

The user search file 2014 is employed to implement the log chain crossing. At update of the signature log file 2013, the file 2014 stores information of a communicating other party of a message with a signature together with a signature number.

For example, "number=1" in the item 3011 of the record 3008 in the user search file 2014 corresponds to number=1" of the item 3004 in the signature log file 2013. The item 3012 "transmission" in the user search file 2014 indicates that the record 3001 with the item 3004 set as "number=1" in the signature log file 2013 has been generated by the user device 1a and has been transmitted to a communicating other party user indicated by the item 3013, namely, "kunihiko@AAA.co.jp".

Therefore, when the log chain crossing is used, the user can determine, for each signature log entry, a destination user or a source user of the signature associated with the record by use of the user search file 2014.

Referring now to the flowcharts of FIGS. 4 to 9 and to processing of the user device 1a as a representative example, description will be given of processing of the digital signature system in each user device 1a, 1b, or 1c configured as above.

Figure 4:
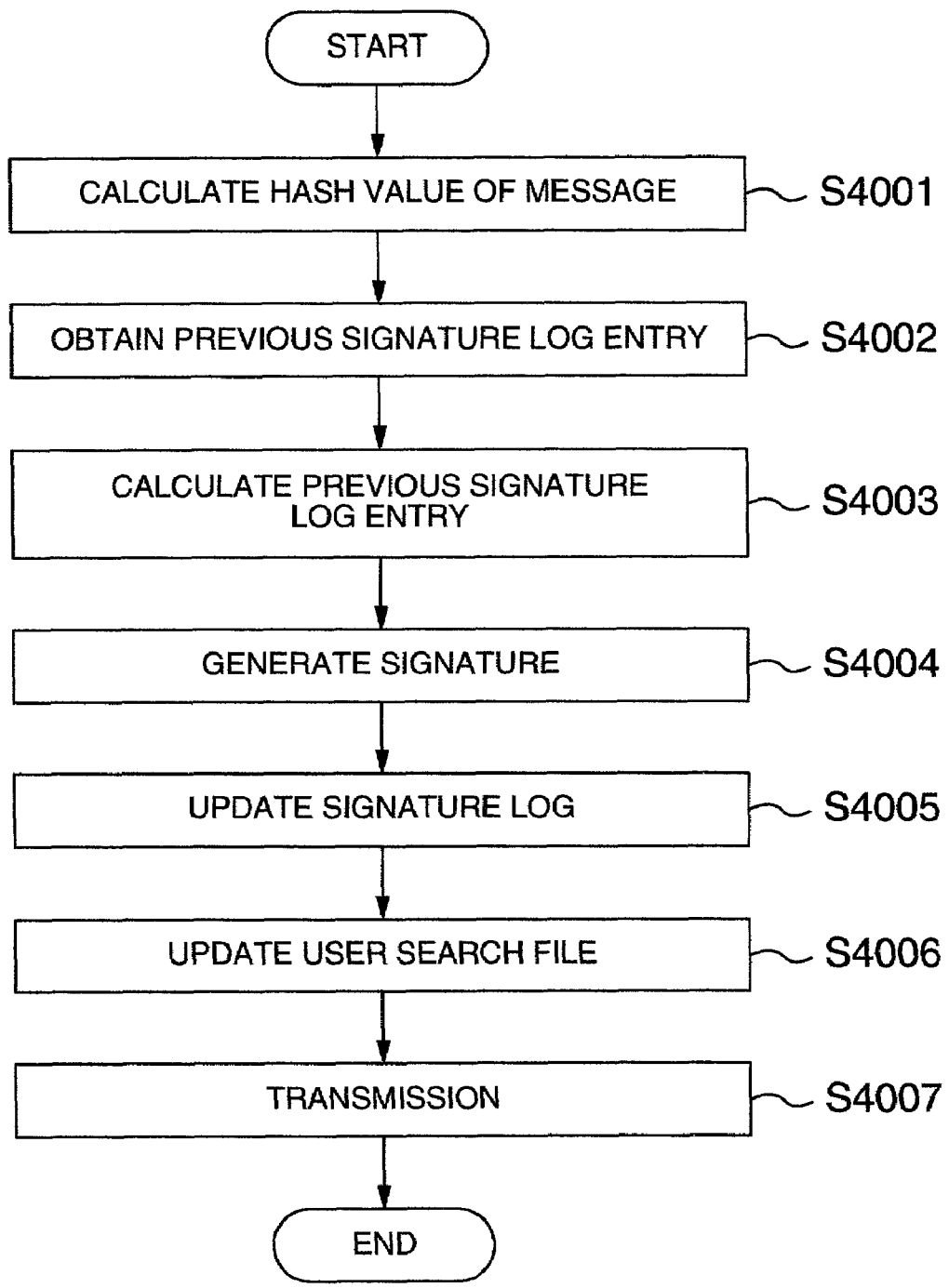
FIG. 4 is a flowchart showing an example of operation of a transmitting program in the user apparatus of FIG. 2.
Figure 5:
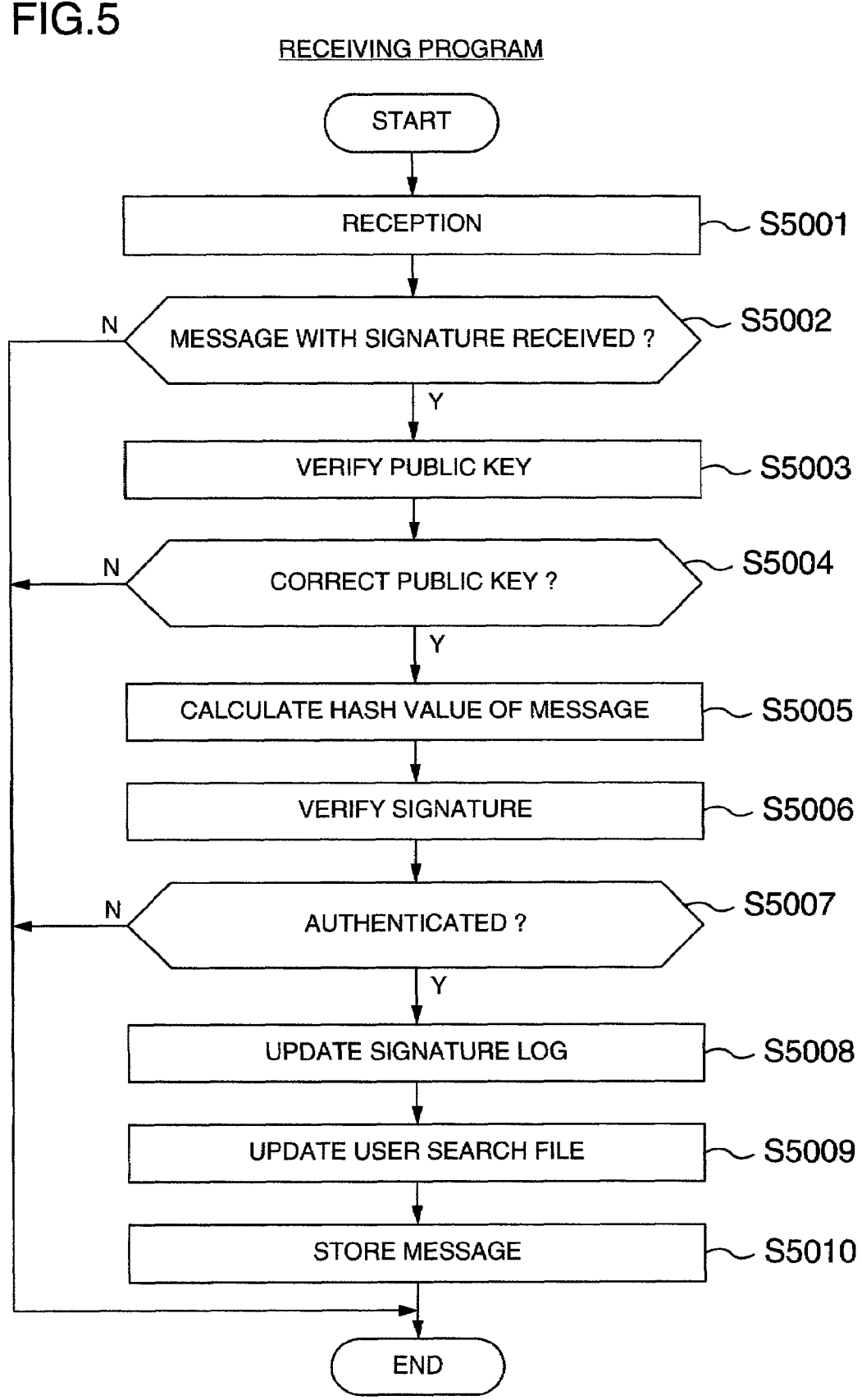
FIG. 5 is a flowchart showing an example of operation of a receiving program in the user apparatus of FIG. 2.
Figure 6:
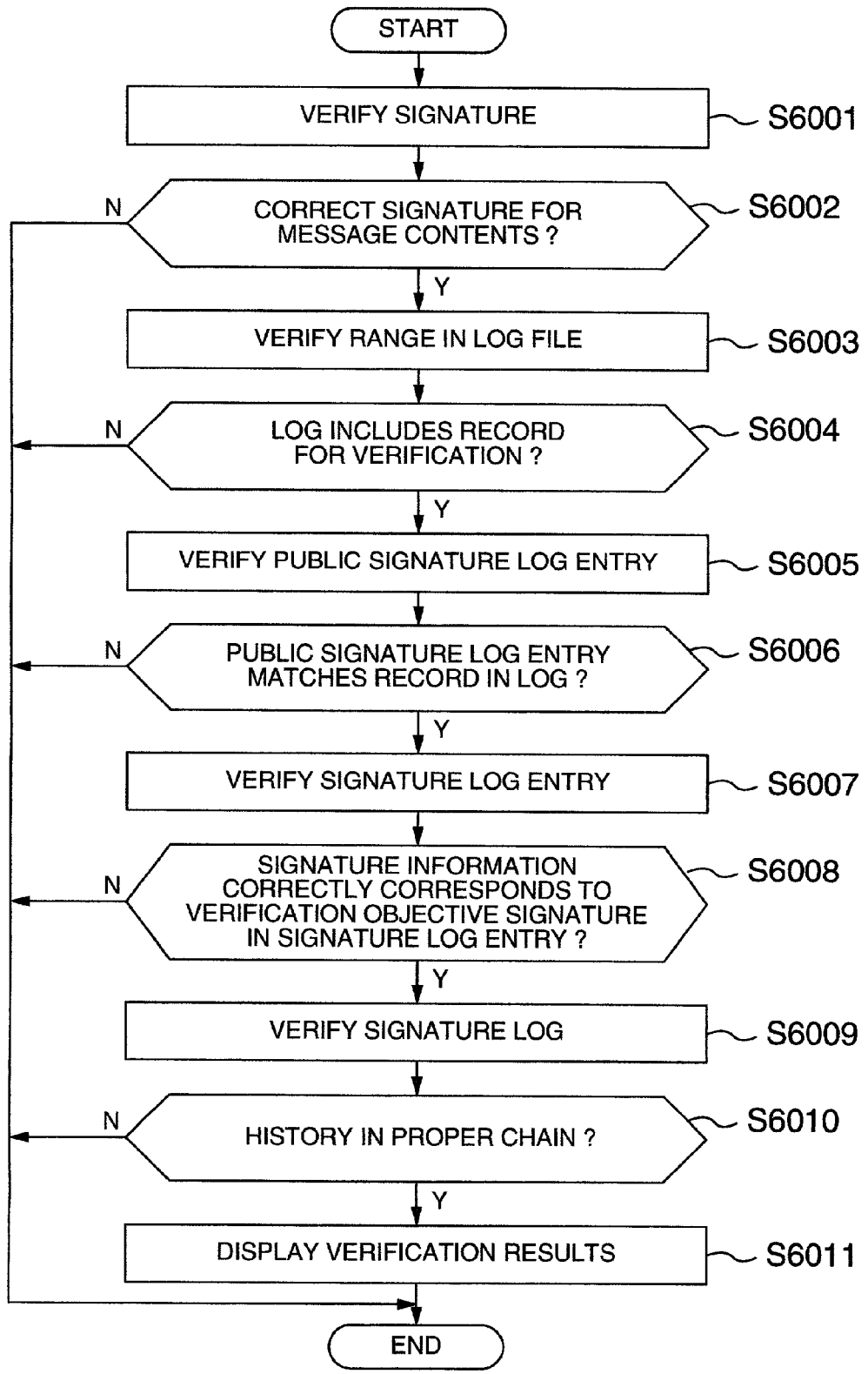
FIG. 6 is a flowchart showing an example of operation of a message verifying program in the user apparatus of FIG. 2.
Figure 7:
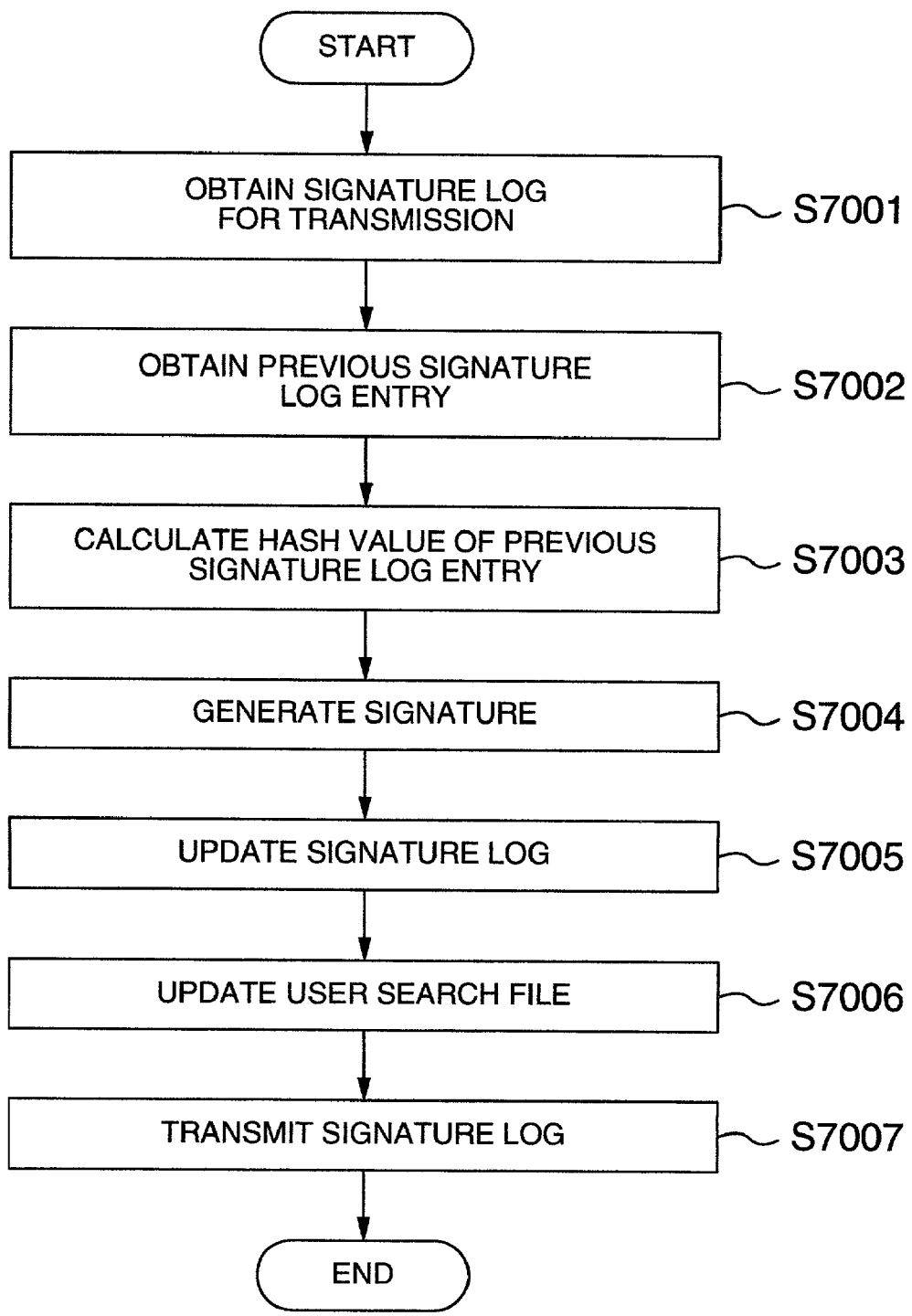
FIG. 7 is a flowchart showing an example of operation of a signature log transmitting program in the user apparatus of FIG. 2.
Figure 8:
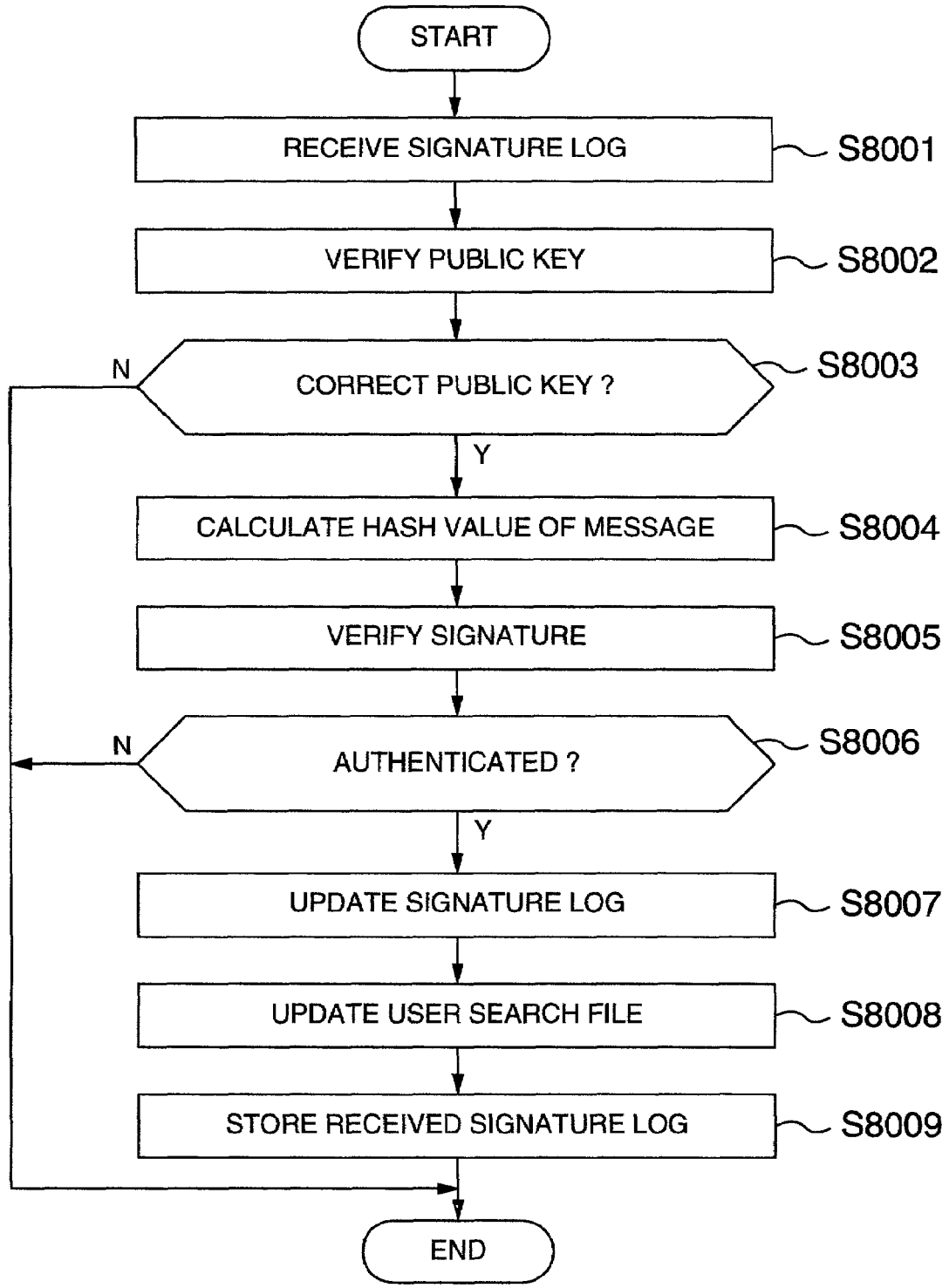
FIG. 8 is a flowchart showing an example of operation of a signature log receiving program in the user apparatus of FIG. 2.

The flowchart of FIG. 4 shows a processing example of the user device 1a according to the transmitting program 2007 of FIG. 2. The flowchart of FIG. 5 shows a processing example of the user device 1a according to the receiving program 2008 of FIG. 2. The flowchart of FIG. 6 shows a processing example of the user device 1a according to the message verifying program 2009 of FIG. 2. The flowchart of FIG. 7 shows a processing example of the user device 1a according to the signature log transmitting program 2010 of FIG. 2. The flowchart of FIG. 8 shows a processing example of the user device 1a according to the signature receiving program 2011 of FIG. 2. The flowchart of FIG. 9 shows a processing example of the user device 1a according to the request form processing program 2012 of FIG. 2.

The example shown in FIG. 4 is the processing of the user device 1a according to the transmitting program 2007 of FIG. 2, namely, an example of processing of the transmitting section 5a of the digital processing section 5 in the user device 1a shown in FIG. 1. In step S4001, the program 2007 calculates, using a hash function, a hash value of the message for which a signature is to be generated.

In the example of the signature log file 2013 of FIG. 3A, a hash value is calculated, for example, for the item 3006 in the record 3003 (number=3). As a result, "H(M3)" is recorded as the hash value of message.

In step S4002, the program 2007 obtains from the signature log file 2013 a signature log entry generated at previous signature generation or at previous signature reception, namely, a latest signature log entry. In step S4003, the program 2007 generates a hash value, by using a hash function, of the latest signature log entry obtained in step S4002.

For example, assume that the record 3002 (in a row indicated by a reference numeral 3002) in the signature log file 2013 shown in FIG. 3A is the latest signature log entry. The program 2007 calculates a hash value for the combination of the data of items 3004-3007 (signature log entry No. "2", previous signature log entry hash value "H(S1)", and user's signature or other user's signature log entry information "32||H(S32)" by applying the hash function to the data. The calculated hash value "H(S2)" is set as the previous signature log entry hash value which may be used in the subsequent steps S4004 and S4005.

In step S4004, the program 2007 generates a digital signature using a secret key for data obtained by combining the hash values respectively resultant from the steps S4001 and S4003 with each other.

The signature log entry number is a unique sequential number assigned to each signature log entry and is used to identify the signature log entry. For example, the signature log entry number of the signature being currently generated is obtained by adding one to the record number of the previous signature log entry. The signature log entry number is stored in the item 3004 in each record of the signature log file 2013. Numbers 1 to 3 respectively of the records 3001 to 3003 are signature log entry numbers.

In the generation of the digital signature, for example, for the record 3003 in step S4004, the program 2007 generates a digital signature "Sign(3||H(S2)||H(M3))" using a secret key for data obtained by combining the signature log entry number "3", the hash value "HM3" calculated by step S4001, and the hash value "H(S2)" calculated in step S4003 with each other.

The sign record number, e.g., "3" need not be necessarily added to the data used to generate the signature. However, when the number is falsified, the log chain crossing fails. Therefore, it is desirable to include the signature log entry number in the signature generating data.

As above, by adding the hash value "H(S2)" calculated in step S4003 to the signature generating data in the processing of step S4004, the program 2007 can generate for the message a digital signature "Sign(3||H(S2)||H(M3))" in which the past signature log is reflected.

In step S4005, the program 2007 registers the data including the signature log entry number "3", the previous signature log entry hash value "H(S2)", and the message hash value "H(M3)" used to generate the signature in step S4004 and the generated signature "Sign(3||H(S2)||H(M3))" as a sign generation record to the record 3003 in the signature log file 2013. The record is the latest signature log entry corresponding to the generated signature. In the file 2013 shown in FIG. 3A, the records 3001 and 3003 excepting the record 3002 are recorded to be managed in a time series.

In step S4006, the program 2007 adds the signature log entry number "3" corresponding to the generated signature and information of the communication other party to the row of the record 3010 in the user search file 2014. The information of the communication other party is, for example, a mail address as exemplified in the item 3013 of the user search file 2014 shown in FIG. 3B.

In step 4007, the program 2007 transmits the message together with the signature "Sign(3||H(S2)||H(M3))" generated in step S4004, data necessary for verification including the signature log entry number "3" and the previous signature log entry hash value "H(S2)", a public key necessary for verification, and a public key certificate.

Referring next to FIG. 5, description will be given of processing of the user device according to the receiving program 2008 of FIG. 2, namely, an example of processing of the receiving section 5b of the digital processing section 5 in the user device 1a shown in FIG. 1.

In step S5001, the program 2008 conducts a receiving operation. In step S5002, the judgment is made to determine whether or not a message with a digital signature has been received. If such a message has been received, control goes to step S5003.

In step S5003, the program 2008 verifies legitimacy of the public key and the public key certificate received together with the message. In step S5004, the public key is verified. In step S5005, the program 2008 calculates a hash value for the message using a hash function.

In step S5006, the program 2008 verifies legitimacy of the signature using the signature log entry number, the previous signature log entry hash value, the hash value of the message generated in step S5005, and the public key received together with the message.

If the signature is successfully verified in step S5007, control goes to step S5008. The program 2008 generates a signature log entry and updates the signature log. For example, a new record associated with the received signature is added to the signature log file 2013 as indicated by the record 3002 (number =2) of FIG. 3A.

The signature log entry of the record 3002 at reception of the message differs from that at transmission thereof. That is, the program 2008 generates a signature log entry of the message source partner according to data received together with the message to save a hash value (H(S32)) thereof in place of the signature at transmission of the message.

By generating the signature log entry having stored the other user's (party's) signature information and by updating the log, i.e., the signature log file 2013 also at reception of the message as above, log information is mutually distributed between the users and is distributively stored in the associated users. When the signature log is lost in any one of the users, the signature verification can be carried out using the signature log stored in another user by use of the log chain crossing. At each reception of a message, whether or not the log is to be updated at reception of the message may be selected by the receiving party depending on cases.

In step S5009, the program 2008 adds the signature log entry number (2) associated with the received signature and information of the communicating other party to the user search file 2014. That is, as can be seen from the record 3009 of the file 2014 of FIG. 3B, "reception" is recorded in the transmission/reception code 3012 and a mail address s-itoh@BBB.co.jp of the transmission source party is recorded in the other party information 3013.

Finally, the program 2008 stores the message with the signature in a particular place in step S5010.

Referring next to FIG. 6, description will be given of processing of the user device according to the message verifying program 2009 of FIG. 2, namely, an example of processing of the message verifying section 5c of the digital processing section 5 in the user device 1a shown in FIG. 1.

The message verifying program 2009 conducts signature chain verification according to the signature log for a message generated or received in the past.

To verify whether or not a message generated or received in the past is correct, i.e., acceptable, the signature chain verification is conducted using the signature log for the following reasons.

The reasons will be described by referring to FIG. 11. For message 1 or 2 in a message with signature 2016 saved in the database 2015, the computer technology and decryption techniques are developed with lapse of time after the message is generated in encryption method 1. Therefore, in some cases, encryption method 1 is broken and hence a third person other than the possessor of the associated secret key can make a signature in encryption method 1. In this situation, legitimacy of a message for which a digital signature is generated in encryption method 1 becomes dubious. On the other hand, the encryption for message 3 or 4 has been changed to encryption method 2 having higher safety, and a signature is generated for message 3 or 4 in encryption method 2. Since there exists almost no chance in which encryption method 2 is broken, and hence data of the signature of message 3 or 4 can be regarded valid. Signature data of the messages in the past reflects in the signatures of messages 3 and 4. The signature data chain is then verified as follows. The chain of signature data is verified using the signature data of message 4 and that of message 3 immediately before message 4, the chain of signature data is verified using the signature data of message 3 and that of message 2 immediately before message 3, and so on. By verifying the chain in this manner, it is possible to determine whether or not a message with signature generated or received in the past is correct. The chain verification is achieved as above.

When there occurs leakage of a secret key used at generation of a signature for a message with signature generated or received in the past (a message with signature 2016 saved in the database 2015) or when there exists a fear of such leakage of the secret key, signature verification including signature chain verification can be conducted by the message verifying program using the signature log. That is, the signature chain can be verified through the signature log entries of legitimate signatures generated before the leakage of the secret key. Even when there does not exist such a case in which the encryption method is broken or such a case of leakage of the secret key, the message verifying program of FIG. 6 using the sequence verification may be employed to prove legitimacy of the message with higher reliability. Description will be specifically given of the message verifying program of FIG. 6 according to an example of the user device 1a.

In steps S6001 and S6002, the program 2009 conducts ordinary signature verification (substantially equal to processing of steps S5003 to S5006 of FIG. 5) using a message 2016, a signature 2017 associated therewith, and data items 2013 and 2014 necessary for verification.

In steps S6003 and S6004, the program 2009 determines whether or not signature log 2013 includes a signature log entry corresponding to a signature 2017 to be verified. The program 2009 also determined whether or not the signature log 2013 includes a signature log entry of the signature open to public inspection. The signature log used in the processing is a signature log file 2013 of the user device 1a or signature log of a user of another user device.

Presence or absence of the signature log entry is checked out as follows. Of the message generated or received in the past and its digital signature, a digital signature specified for verification (for example, a message (1) of messages 2016 in the database 2015) is collated with signature data (a digital signature, a number (an identifier number) of signature log entry information including the digital signature, and a previously registered hash value of digital signature log entry information) to determine whether or not these items match each other.

In steps S6005 and S6006, the publication organization compares the number of the opened signature log entry with that of the signature log entry in the signature log 2013 to thereby determine whether or not the numbers are equal to each other. In steps S6007 and S6008, the program 2009 makes a check to determine whether or not the signature for verification is equal to the signature saved in the associated signature log entry.

In steps S6009 to S6011, the program 2009 verifies the chain of record from the signature log entry having the number equal to that of the opened signature log entry to the signature log entry corresponding to the signature for verification. Specifically, the program 2009 compares the hash value between two successive signature log entries in the signature log file 2013 in step S6009. If the hash values are equal to each other, the program 2009 assumes that the signature log entries has a correct continuity of the chain in step S6010.

Finally, the program 2009 displays results of the verification in step S6011.

Referring next to FIG. 7, description will be given of processing of the user device according to the signature log transmitting program 2010 of FIG. 2, namely, an example of processing of the signature log transmitting section 5d of the digital processing section 5 in the user device 1a shown in FIG. 1. In step S7001, the program 2010 obtains from the signature log file 2013 signature log to be transmitted.

In steps S7002 to S7006, the program 2010 generates, in a similar way as for message transmission, a signature for the signature log and signature log entry information and then registers the generated items to the signature log file 2013 and the user search file 2014. In step S7003, the hash value of the previous signature log entry is calculated. In step S7004, the digital signature for the signature log to be transmitted is generated. In step S7005, the signature log file 2013 is updated. In step S7006, the user search file 2014 is updated.

Finally, the program 2010 transmits the signature log obtained in step S7001 to the partner in step S7007. For a message sent with a signature from a signatory in the past, if the receiver of the message desires to verify legitimacy of the message with signature by message verifying processing, the signatory sends, in response to an associated request from the receiver, signature log necessary for verification to the receiver using the signature log transmitting program 2010.

Referring next to FIG. 8, description will be given of processing of the user device according to the signature log receiving program 2011 of FIG. 2, namely, an example of processing of the signature log receiving section 5e of the digital processing section 5 in the user device 1a shown in FIG. 1.

The user device 1a conducts ordinary signature verification for the received signature log and the signature associated therewith in steps S8001 to S8008 of the signature log receiving program 2011 to update the signature log file 2013 and the user search file 2014. In step S8001, the signature log is received. In step S8002, the received public key is verified. In step S8003, the judgment is made to determine whether or not the public key is correct. In step S8004, the hash value of the received message is calculated. In step S8005, the received digital signature is verified. In step S8006, the judgment is made to determine whether or not the received digital signature is authentic. In step S8007, the signature log file 2013 is updated. In step S8008, the user search file 2014 is updated.

In steps S8009, the program 2013 stores the received signature log in a storage such as a hard disk. The stored signature log is used in the message verifying program.

Referring next to FIG. 9, description will be given of processing of the user device according to the request form processing program 2012 of FIG. 2, namely, an example of processing of the request form processing section 5f of the digital processing section 5 in the user device 1a shown in FIG. 1. The program 2012 handles a request form used when the log chain crossing is utilized.

The log chain crossing is employed when signature log entrys opened to the public after a signature log entry corresponding to a signature for verification are missing in the log file 2013 or when part of the log is missing and hence the chain cannot be verified. That is, signature log entrys of another user are used to verify the chain using the log chain crossing. The request form is a document or a message employed to request another user for signature log entrys necessary for the chain verification using the log chain crossing.

To use the log chain crossing, the destination of the request form must be determined. In other words, to verify an objective signature, the user must determine which one of his or her signature log entrys is to be verified for legitimacy to know whose signature log includes the signature log entry.

As a technique to obtain a correspondence between the signature log entrys and the signatures, namely, between the signature log entrys and the sources of the signatures or the destinations of the signatures, it is efficient to keep also information, for example, a mail address of the communication partner in the signature log entry.

However, in the message verification or in the use of the log chain crossing, part or all of the signature log is passed to another user. If information relating to correspondence with business contacts or partners is included in the signature log, there is a risk that such private information may be disclosed to the third party user.

In the example, information 3013 to identify the business contacts is stored in the user search file 2014 separately from the signature log 2013. Each signature log entry is associated with information of the partner in the user search file 2014 only by a signature log entry number 3004. Therefore, even when the signature log is opened to the public or is transmitted to another party or user, the leakage of the information of the business contacts does not take place.

The user device 1a determines according to steps S9001 and S9002 of the request form processing program 2012 that the request form processing content is reception or transmission of a request form. For transmission, the program 2012 makes a search to determine which one of the signature log entrys is to be proved for legitimacy to verify the objective signature.

For the signature log entry retrieved in step S9003 for the verification, the program 2012 refers in step S9004 to the signature log entry numbers 3004 and 3011 and makes a search through the user search file 2014 to determine a user who keeps the signature log entry necessary for the verification.

In step S9005, the program 2012 sends, to the user 3013 retrieved in step S9004, a request form including description of the number of the necessary signature log entry.

When the result of the check in step S9002 is "reception of a request form", the program 2012 makes a search through the user search file 2014 in step S9006 according to information such as a mail address of the request source to retrieve a signature log entry generated when a message is received from the request source user in the past.

In step S9007, the program 2012 makes a search through the signature log entrys retrieved in step S9006 to extract therefrom any signature log entry having saved a partner's signature log entry corresponding to the signature log entry number (the number of the signature log entry necessary for the partner) described on the request form.

In step S9008, the program 2012 obtains signature log entrys required for the request transmitting source to verify the objective signature. Specifically, the program 2012 detects signature log entrys opened to the public after the signature log entry extracted in step S9007 and uses, as the required signature log entrys, all signature log entrys ranging from the signature log entry extracted in step S9007 to the opened signature log entry.

In step S9009, the program 2012 transmits the signature log entry obtained in step S9008 to the request source user.

Referring to FIG. 10, description will be in more detail of a procedure when the request form transmitting user and the request form receiving user utilize the log chain crossing.

FIG. 10 is an explanatory diagram showing a concrete example of processing in a digital signature system according to the present invention.

In the example of FIG. 10, a user device A desires to verify a signature for signature log entry number 27 in signature log 10001 of A. However, the log of signature log entry number 31 and subsequent log are lost, and hence the signature cannot be verified in this situation. According to the example, the signature verification is possible by use of the log chain crossing as below.

The user device A retrieves from a user search file 10002 a partner having possibly saved the signature log entry of the user device A in a range from signature log entry number 27 to signature log entry number 31.

As a result, since the signature log entry of record number 30 is a signature log entry of a signature generated when a message with signature is sent to a user device B, it is determined that the signature log of the user device B has saved the signature log entry with record number 30 of the user device A ((1) in FIG. 10).

The user accordingly generates a request form 10003 requesting for the signature log entry of signature log entry number 30 and transmits the request form 10003 to the user device B ((2) in FIG. 10).

As above, by transmitting a request form, signature log required for the verification of the signature is shown to the other user to elicit the cooperation of the other user for chain crossing. Thus the signature verification is achieved using the log chain crossing.

Specifically, the user device B having received the request form 10003 from the user device A accesses the user search file 10004 of B to retrieve, from the signature log 10005 of B, a signature log entry generated when a message with signature is received from the user device A. As a result, for example, it is determined that the signature log entrys of signature log entry numbers 21 and 23 are to be retrieved from the signature log 10005 of B ((3) in FIG. 10).

By examining the signature log entrys of record numbers 21 and 23 in the signature log 10005 of B, the user device B can determine, for example, that the signature log entry with record number 21 contains the signature log entry with record number 30 of the user device A, which is necessary for the user device A.

In FIG. 10, the signature log entry with record number 24 in the signature log 10005 of B has been opened to the public in the publication organization device 2 of FIG. 1. Therefore, when the signature log entrys with record numbers 21 to 24 are transmitted from the user device B to the user device A, the user device A can verify the objective signature using the signature log transmitted from the user device B. Therefore, the user device B transmits the signature log entrys with record numbers 21 to 24 to the user device A ((4) in FIG. 10).

Having received the signature log entries with record numbers 21 to 24 from the user device B, the user device A verifies the signature using the records (27 in FIG. 10).

As described in conjunction with FIGS. 1 to 11, the signature number (identifier number), the generated signature (digital signature), and the previous signature log entry hash value are kept remained in each signature log entry (digital signature log entry information) of the signature log file 2013 in the example. The signature log entry (digital signature log entry information) is signature information generated at each signature (digital signature) generation to be kept remained in the log (signature log file 2013). Each time a signature (a digital signature) is generated, a signature log entry associated therewith is generated to be added to the log (signature log file 2013). Moreover, the signature number (identifier information) is assigned as a serial number and is used to specify a particular signature log entry (digital signature log entry information) in the signature log. Additionally, the generated signature (digital signature) proves that the signature log entry (digital signature log entry information) is appropriately associated with the corresponding signature. The previous signature log entry hash value is used to verify the log chain.

In the example, to implement the log chain crossing, the signature log file 2013 is updated also at reception of a message with signature. That is, using data received from the other user together with the signature, the system generates a signature log entry (digital signature log entry information) of the other user and adds a signature number (identifier information), a hash value of the other user's signature log entry (digital signature log entry information), and the previous signature log entry (digital signature log entry information) hash value as a new signature log entry (digital signature log entry information) to the log (signature log file 2013). As a result, when the user transmits a message with signature to the other user, a signature log entry (digital signature log entry information) of the user corresponding to the signature (digital signature) is stored also in the signature log (signature log file 2013) of the other user.

To increase efficiency of the log chain crossing, a user search file 2014 is additionally prepared. At update of the signature log (signature log file 2013), the communication party of data with digital signature (a message or a document) is also stored in the user search file 2014 together with a signature number (identifier information). Therefore, when the log chain crossing is used, the user can determine for each signature log entry (digital signature log entry information) the destination or source user of the associated signature using the user search file 2014.

That is, in this embodiment, the user device on the digital signature generating side executes the signature generation processing in which a message or a hash value thereof is processed together with a secret key possessed by the digital signature generating user to generate a digital signature for the message, the signature log update processing which generates, using the generated digital signature, a signature log entry (digital signature log entry information) including signature information of the digital signature and adds the generated signature log entry to the signature log (signature log file 2013) to which signature log entrys generated in the past are registered; and the transmission processing to transmit a message with digital signature including the generated digital signature and a message. Moreover, the user device on the digital signature verifying side executes the reception processing to receive the transmitted message with digital signature as a message with digital signature to be verified, the verification processing which examines whether or not the message correctly corresponds to the digital signature using a public key paired with a secret key to thereby verify that the received message with digital signature is transmitted from the digital signature generating user, and the signature log update processing which generates using the digital signature a signature log entry containing signature information of the digital signature to add the new signature log entry to the signature log (signature log file 2013) to which signature log entrys generated in the past are registered.

Additionally, the signature generation processing on the digital signature generating side generates a digital signature for the message by applying a secret key to signature objective data obtained by combining with each other the message or a hash value thereof, a hash value of the signature log entry recorded at previous signature generation or reception, and the signature log entry number (identifier information) assigned to each signature log entry to identify a particular signature log entry from the generated signature log entrys.

The signature log update processing on the digital signature generating side generates a signature log entry for the generated signature by combining the signature log entry number (identifier information) assigned to each signature log entry to identify a particular signature log entry in the generated signature log entrys, the generated signature, and the hash value of the signature log entry generated at previous signature generation or reception and adds the new signature log entry to the signature log (signature log file 2013) to which the signature log entrys generated in the past are registered.

Moreover, the log update processing conducts, in addition to update of the signature log, an operation to update, at signature generation or at reception of a message with signature, the user search file 2014 having recorded the signature log entry number (identifier information) unique to the signature log entry having recorded signature information generated or received at signature generation or at reception of a message with signature and the user information of the transmission destination of the generated signature or the generating user (transmission source) of the received signature.

The transmission processing on the digital signature generating side transmits the message, the digital signature generated for the message, the signature log entry number (identifier information) of the signature log entry generated for the digital signature, and the hash value of the signature log entry recorded at previous signature generation or reception.

Furthermore, the signature log update processing on the digital signature verifying side generates a signature log entry for the received signature by combining with each other signature data transmitted from the digital signature generating side, the signature log entry number (identifier information) assigned to each signature log entry to identify a particular signature log entry from the generated signature log entrys, and the hash value of the signature log entry generated at previous signature generation or reception and adds the new signature log entry to the signature log (signature log file 2013) to which the signature log entrys generated in the past are registered.

In addition to the verification processing on the digital signature verifying side, there is executed the log verification processing in which for a verification objective digital signature generated or received in the past, it is verified to determine whether or not the verification objective digital signature generated or received in the past matches signature data contained in the signature log entry received or generated when the digital signature is generated or received and it is further verified to determine whether or not the signature log entrys are correctly chained to each other from the latest valid signature log entry to the signature log entry containing the verification objective signature data.

Additionally, there is executed the log transmission processing to transmit signature log or the log reception processing to receive signature log.

When the verification is conducted using signature log in the device on the digital signature verifying side, if signature log required for the verification is absent, there is executed, to use signature log of another user, the request form transmission processing which notifies a signature log entry number of the signature log entry necessary for the verification to another user.

Moreover, at reception of a request form, the request form receiving side executes the request form reception processing which transmits all or part of the signature log to the request form transmitting side according to the requested signature log entry described in the request form.

To determine such a request form transmitting destination or to determine a range of log to be transmitted in the log transmission, information of the signature log entry number and the communication partner recorded in the user search file 2014 is used.

As above, according to the example, it is possible to provide a digital signature technique using signature log in which falsification and forgery of a digital signature become more difficult. Moreover, there can be implemented a highly reliable and digital signature technique with high safety which allows signature verification using log of another party or user and distributed storage of signature log entrys and in which the verification can be conducted by recovering missing log, that is, by using signature log of another party.

The present invention is not restricted by the examples described by referring to FIGS. 1 to 11, but the examples can be modified in various ways within the scope of the present invention. For example, the user devices 1a to 1c, the publication organization device 2, and the arbitrating organization device 3 are connected via the network to each in the configuration of the example as shown in FIG. 1. However, the arbitrating organization device 3 can be dispensed with. By opening information to the public using a newspaper or the like, the publication organization device 2 can also be dispensed with. That is, the configuration may include only the user devices 1a to 1c.

The configuration is not restricted by the user devices 1a to 1c, that is, the number of user devices may be more than three. The configuration of the user devices 1a to 1c is not restricted by that shown in FIG. 2. For example, the configuration may include a microphone and a voice converting function to generate a digital signature according to audio data.

Although the above-mentioned example uses an optical disk as the program recording medium, a flexible disk or the like can also be used as the recording medium. Also for the program installation, the program may be downloaded via a communicating device and the network to be installed in the system.

According to the present invention, the information of the communication other party is not opened to any parties other than the possessor thereof even during the chain verification. While protecting privacy of each user, it is possible to efficiently implement the digital signature with high provability using the signature log, and the log chain crossing can also be efficiently implemented.

It should be further understood by those skilled in the art that the foregoing description has been made on embodiments of the invention and that various changes and modifications may be made in the invention without departing from the spirit of the invention and the scope of the appended claims.

What is claimed is:

1. A method of managing a digital signature in a digital signature system in which the digital signature is attached to a message to prove validity of the message, comprising the steps of:

generating a user's digital signature to be transmitted together with a user's message by using signature log entry information previously registered in a signature log file of a user which is prepared in a memory;

generating a user's signature log entry information associated with the user's digital signature using data used to generate the user's digital signature, and registering the generated user's signature log entry information in the signature log file;

generating, when a message with a different user's digital signature is received from an external device, a different user's digital signature log entry information using the received message, the received different user's digital signature, and data to verify the received different user's digital signature, and registering the different user's digital signature log entry information in the signature log file;

registering, in a user search file prepared in the memory, information indicating whether each signature log entry information in the signature log file relates to either the transmitted user's digital signature or to the received different user's digital signature and registering user identifier information indicating either a transmission destination of the transmitted user's digital signature or a transmission source of the received different user's digital signature for each signature log entry information;

identifying, according to the user identifier information registered in the user search file, the different user's signature log entry information associated with the received different user's digital signature registered in the signature log file or the user's signature log entry information associated with the transmitted user's digital signature registered in the signature log file and conducting verification using a log chain crossing using the user's or different user's signature log entry information identified in the signature log file;

transmitting, at transmission of the user's message, data to verify the user's digital signature to be transmitted, the data to verify the user's digital signature including the generated user's digital signature and first identifier information to identify the user's signature log entry information associated with the user's digital signature, and a hash value of signature log entry information previously registered in the signature log file;

verifying validity of a digital signature attached to a previously generated user's or different user's message, using a public key paired with a secret key used to generate the digital signature to be verified;

determining whether or not signature log entry information associated with the digital signature to be verified has been registered in the signature log file;

judging whether or not authorized signature log entry information which is newer than a signature log entry associated with the digital signature to be verified and which has been confirmed as authorized information is properly chained with signature log entry information registered immediately before the authorized signature log entry information, and by repeatedly conducting said judging step, determining whether or not continuity is maintained up to a signature log entry associated with the digital signature to be verified;

transmitting at least part of the user's signature log entry information registered in the signature log file with or without the user's message to a different user; and receiving at least part of the different user's signature log entry information which is transmitted from the different user together with the different user's digital signature, verifying the different user's digital signature, and adding the received different user's signature log entry information to the signature log file, wherein said step of generating the user's signature log entry information and registering the user's signature log entry information in the signature log file comprises adding new user's signature log entry information to the signature log file, the new user's signature log entry information including the first identifier information to identify the user's signature log entry information, the generated user's digital signature, and a hash value of the signature log entry information previously registered in the signature log file, wherein said step of generating and registering the different user's signature log entry information comprises:

generating different user's signature data based on second identifier information to identify the different user's signature log entry information of the received different user's digital signature corresponding to the received message and a hash value of user's or different user's signature log entry information previously registered in the signature log file; and adding the generated different user's signature log entry information to the signature log file, said added different user's signature log entry information including the second identifier information to identify the different user's signature log entry information of the received different user's digital signature corresponding to the received message, the hash value of the user's or different user's signature log entry information previously registered in the signature log file, and the generated different user's signature data, and wherein said step of generating the user's digital signature comprises generating data by combining with each other the user's message or a hash value of the user's message, the hash value of signature log entry information previously registered in the signature log file, and the first identifier information to identify the user's signature log entry information of the user's digital signature to be generated, and generating a new digital signature using the combined generated data and a predetermined secret key.

2. A digital signature managing method according to claim 1, further comprising the steps of:

identifying, in the judging of the chain of the signature log entry information associated with the digital signature to be verified, if desired signature log entry information required for the judging of the chain has not been registered in the signature log file, the different user according to user identifier information in the user search file, said different user possessing a signature log file to which the desired signature log entry information has been registered;

transmitting third identifier information identifying the desired signature log entry information to said different user thus identified and thereby requesting said different user to provide the desired signature log entry information; and judging of the chain using the desired signature log entry information provided from said different user according to the request.

3. A digital signature managing method according to claim 2, wherein in a side of said different user having received the request for the desired signature log entry information, corresponding identifier information on said different user side identifying the desired signature log entry information registered to the user search file on said different user side is obtained according to the third identifier information identifying the desired signature log entry information thus received, the desired signature log entry information is selected from the user search file on said different user side according to the corresponding identifier information on said different user side, and the desired signature log entry information is transmitted to the user having transmitted the request for the desired signature log entry information.

4. A digital signature managing method according to claim 1, further comprising the step of submitting, when a user requests an arbitrating organization to verify validity of a message, a signature log file and a user search file respectively associated with the message to be verified, wherein the arbitrating organization verifies the message using one or more signature log files and the user search file thus submitted.

5. A digital signature managing method according to claim 1, further comprising the step of transmitting signature log entry information registered to the signature log file to a publication organization periodically or at an interval of a predetermined period, wherein the publication organization examines and opens the signature log entry information to the public.

6. A digital signature managing method according to claim 1, wherein the signature log file of the user is stored in the memory of a user's computer terminal.

7. An apparatus for managing a digital signature in a digital signature system in which the digital signature is attached to a message to prove validity of the message, comprising:

a memory having stored a signature log file of a user in which signature log entry information associated with a user's digital signature is to be registered and a user search file;

means for generating a user's digital signature to be transmitted together with a user's message by using signature log entry information previously registered in the signature log file which is prepared in the memory;

means for generating a user's signature log entry information associated with the user's digital signature using data used to generate the user's digital signature, and for registering the generated user's signature log entry information in the signature log file;

means for generating a different user's signature log entry information associated with a received message, the received message including the different user's digital signature and data to verify the received different user's digital signature, and for registering the different user's generated signature log entry information in the signature log file; and means for registering, in the user search file, information indicating whether each signature log entry information in the signature log file relates to either the transmitted user's digital signature or to the received different user's digital signature and for registering user identifier information indicating either a transmission destination of the transmitted user's digital signature or a transmission source of the received different user's digital signature for each previous signature log entry information;

means for identifying, according to the user identifier information registered in the user search file, the different user's signature log entry information associated with the received different user's digital signature registered in the signature log file or the user's signature log entry information associated with the transmitted user's digital signature registered in the signature log file and conducting verification using a log chain crossing using the user's or different user's signature log entry information identified in the signature log file;

means for transmitting, at transmission of the user's message, data to verify the user's digital signature to be transmitted, the data to verity the user's digital signature including the generated user's digital signature and first identifier information to identify the user's signature log entry information associated with the user's digital signature, and a hash value of the signature log entry information previously registered in the signature log file;

means for verifying validity of a digital signature attached to a previously generated user's or different user's message, using a public key paired with a secret key used to generate the digital signature to be verified;

means for determining whether or not signature log entry information associated with the digital signature to be verified has been registered in the signature log file;

means for judging whether or not authorized signature log entry information which is newer than a signature log entry associated with the digital signature to be verified and which has been confirmed as authorized information is properly chained with signature log entry information registered immediately before the authorized signature log entry information, and by repeatedly conducting said judging, determining whether or not continuity is maintained up to a signature log entry associated with the digital signature to be verified;

means for transmitting at least part of the user's signature log entry information registered in the signature log file with or without the user's message to a different user; and means for receiving at least part of the different user's signature log entry information which is transmitted from the different user together with the different user's digital signature, verifying the different user's digital signature, and adding the received different user's signature log entry information to the signature log file, wherein the means for generating the user's signature log entry information and registering the user's signature log entry information in the signature log file comprises means for adding new user's signature log entry information to the signature log file, the new user's signature log entry information including the first identifier information to identify the user's signature log entry information, the generated user's digital signature, and a hash value of signature log entry information previously registered in the signature log file, wherein the means for generating and registering the different user's signature log entry information comprises means for:

generating different user's signature data based on second identifier information to identify the different user's signature log entry information of the received different user's digital signature corresponding to the received message and a hash value of user's or different user's signature log entry information previously registered in the signature log file; and adding the generated different user's signature log entry information to the signature log file, said added different user's signature log entry information including the second identifier information to identify the different user's signature log entry information of the received different user's digital signature corresponding to the received message, the hash value of the user's or different user's signature log entry information previously registered in the signature log file, and the generated different user's signature data, and wherein the means for generating the user's digital signature comprises means for generating data by combining with each other the user's message or a hash value of the user's message, a hash value of the signature log entry information previously registered in the signature log file, and the first identifier information to identify the user's signature log entry information of the user's digital signature to be generated, and generating a new digital signature using the combined generated data and a predetermined secret key.

8. A digital signature managing apparatus according to claim 7, wherein the apparatus includes a user's computer terminal and at least the memory is in the user's computer terminal.

9. A computer readable medium having stored a program of managing a digital signature in a digital signature system in which the digital signature is attached to a message to prove validity of the message, the program comprising instructions facilitating the computer to perform the steps of:

generating a user's digital signature to be transmitted together with a user's message by using signature log entry information previously registered in a signature log file of a user which is prepared in a memory;

generating a user's signature log entry information associated with the user's digital signature using data used to generate the user's digital signature, and registering the generated user's signature log entry information in the signature log file;

generating a different user's signature log entry information associated with a received message, the received message including the different user's digital signature, verifying the received different user's digital signature, and registering the different user's generated signature log entry information in the signature log file; and registering, in a user search file prepared in the memory, information indicating whether each signature log entry information in the signature log file relates to either the transmitted user's digital signature or to the received different user's digital signature, and registering user identifier information indicating either a transmission destination of the transmitted user's digital signature or a transmission source of the received different user's digital signature for each previous signature log entry information, identifying, according to the user identifier information registered in the user search file, the different user's signature log entry information associated with the received different user's digital signature registered in the signature log file or the user's signature log entry information associated with the transmitted user's digital signature registered in the signature log file and conducting verification using a log chain crossing using the user's or different user's signature log entry information identified in the signature log file;

transmitting, at transmission of the user's message, data to verify the user's digital signature to be transmitted, the data to verify the user's digital signature including the generated user's digital signature and first identifier information to identify the user's signature log entry information associated with the user's digital signature, and a hash value of signature log entry information previously registered in the signature log file;

verifying validity of a digital signature attached to a previously generated user's or different user's message, using a public key paired with a secret key used to generate the digital signature to be verified;

determining whether or not signature log entry information associated with the digital signature to be verified has been registered in the signature log file;

judging whether or not authorized signature log entry information which is newer than a signature log entry associated with the digital signature to be verified and which has been confirmed as authorized information is properly chained with signature log entry information registered immediately before the authorized signature log entry information, and by repeatedly conducting said judging step, determining whether or not continuity is maintained up to the signature log entry associated with the digital signature to be verified;

transmitting at least part of the user's signature log entry information registered in the signature log file with or without the user's message to a different user; and receiving at least part of the different user's signature log entry information which is transmitted from the different user together with the different user's digital signature, verifying the different user's digital signature, and adding the received different user's signature log entry information to the signature log file, wherein said step of generating the user's signature log entry information and registering the user's signature log entry information in the signature log file comprises adding new user's signature log entry information to the signature log file, the new user's signature log entry information including the first identifier information to identify the user's signature log entry information, the generated user's digital signature, and a hash value of the signature log entry information previously registered in the signature log file, wherein said step of generating and registering the different user's signature log entry information comprises:

generating different user's signature data based on second identifier information to identify the different user's signature log entry information of the received different user's digital signature corresponding to the received message and a hash value of user's or different user's signature log entry information previously registered in the signature log file; and adding the generated different user's signature log entry information to the signature log file, said added different user's signature log entry information including the second identifier information to identify the different user's signature log entry information of the received different user's digital signature corresponding to the received message, the hash value of the user's or different user's signature log entry information previously registered in the signature log file, and the generated different user's signature data, and wherein said step of generating the user's digital signature comprises generating data by combining with each other the user's message or a hash value of the user's message, a hash value of the signature log entry information previously registered in the signature log file, and the first identifier information to identify the user's signature log entry information of the user's digital signature to be generated, and generating a new digital signature using the combined generated data and a predetermined secret key.

10. A computer readable medium according to claim 9, wherein the signature log file of the user is stored in the memory of a user's computer terminal.

* * * * *